United States Patent [19]

Figuly et al.

[11] Patent Number: 5,094,914

[45] Date of Patent: Mar. 10, 1992

[54] MICROPOROUS ELASTIC SEGMENTED POLYURETHANE SHAPED STRUCTURE

[75] Inventors: Garret D. Figuly; Hsiang Shih, both of Wilmington; Linda H. Smith, Bear, all of Del.

[73] Assignee: E. I. Du Pont de Nemours and Company, Wilmington, Del.

[21] Appl. No.: 631,269

[22] Filed: Dec. 20, 1990

[51] Int. Cl.$^5$ ................................. D02G 3/00
[52] U.S. Cl. ................... 428/376; 428/407; 521/56; 521/60; 521/64
[58] Field of Search ............ 521/60, 64, 56; 428/376, 407

[56] References Cited

U.S. PATENT DOCUMENTS

| | | | |
|---|---|---|---|
| 4,296,174 | 10/1981 | Hanzel et al. | 428/389 |
| 4,859,711 | 8/1989 | Jain et al. | 521/56 |
| 4,898,913 | 2/1990 | Ziemelis et al. | 525/301 |
| 4,921,842 | 5/1990 | Henning et al. | 524/839 |

Primary Examiner—Morton Foelak

[57] ABSTRACT

Solutions of segmented polyurethanes are coagulated to form shaped structures comprising a substantially continuous pore-free sheath surrounding a cellular core.

4 Claims, 4 Drawing Sheets

MICROPOROUS ELASTIC SEGMENTED POLYURETHANE SHAPED STRUCTURE

BACKGROUND OF THE INVENTION

Elastic segmented polyurethane filaments are well known for their resistance to hydrolysis and other desirable properties such as stretch, recovery and power. These properties make the filaments invaluable for swim suits and other end-use applications. The present invention provides the elastic segmented polyurethane in a novel form which lends itself to a broad spectrum of new uses.

DRAWINGS

SUMMARY OF THE INVENTION

This invention provides shaped structures consisting essentially of microporous elastic segmented polyurethane having a void content of from 60 to 90% encapsulated by a substantially continuous sheath having a thickness of less than about 3 microns and having essentially no pores visible at the surface at a magnification of 5000×. The shaped structures may be substantially spherical having a diameter of from about 1 mm. to about 4 mm. or can be filamentary in form of denier from 60 to 1800, in which event only the cut ends will lack the sheath material. Also encompassed by this invention is the method for preparing the shaped structures. The products can be employed as insulation, as carriers for the slow release of imbibed substances, cushioning materials, absorbents for organic solvent spills, etc.

DETAILED DESCRIPTION OF THE INVENTION

The elastic shaped structures of this invention are manufactured from fiber-forming, long chain, synthetic polymer comprised of at least 85% of a segmented polyurethane. Preferably the segmented polyurethane is one based on polyether or polyester. Such polymers are prepared by well-known methods such as those described in U.S. Pat. No. 4,296,174 and in EPO Application No. 343,985 published on Nov. 29, 1989.

To obtain the products of this invention, a solution of the polyurethane is first prepared. Suitable solvents include amide solvents, such as dimethylacetamide (DMAc), dimethylformamide (DMF) and N-methylpyrrolidone (NMP). Suitable solutions have a viscosity of between 125 and 2000 centipoises, preferably from about 500 to 800 centipoises, at room temperature. In practice, polymer is added to the solvent until the desired viscosity is achieved. Generally, from about 8 to 20% by weight of polymer will result in a suitable viscosity.

The solution is then be introduced as droplets of from about 0.01 to 0.05 cubic centimeters (cc.) into a coagulating bath which solidifies the polymer in the form of small substantially spherical beads having a diameter of from about 1 to 4 mm. The coagulating bath comprises a liquid that extracts the solvent of the polymer solution but is a non-solvent for the polymer. Water is suitable for this purpose.

Alternatively, the polymer solution may be spun through a spinneret directly into the coagulating bath and withdrawn therefrom as filament. Still other shaped structures can be obtained by agitation of the coagulating bath as the stream of polymer solution is introduced into the coagulating bath.

Figure 2:
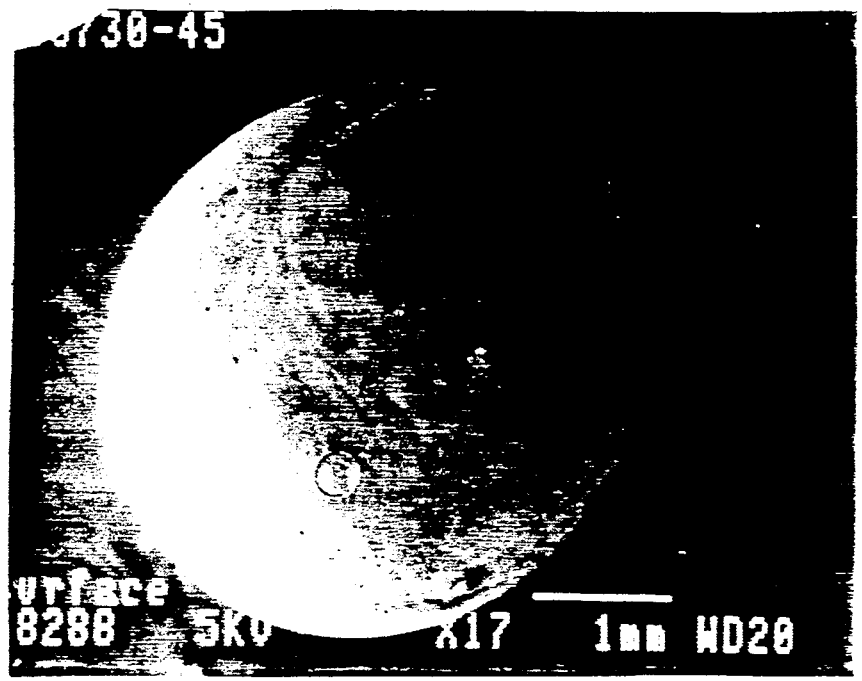
FIG. 2 is an SEM of a surface view of a bead of the invention at 17× magnification showing a substantially continuous sheath encapsulating the bead.
Figure 3:
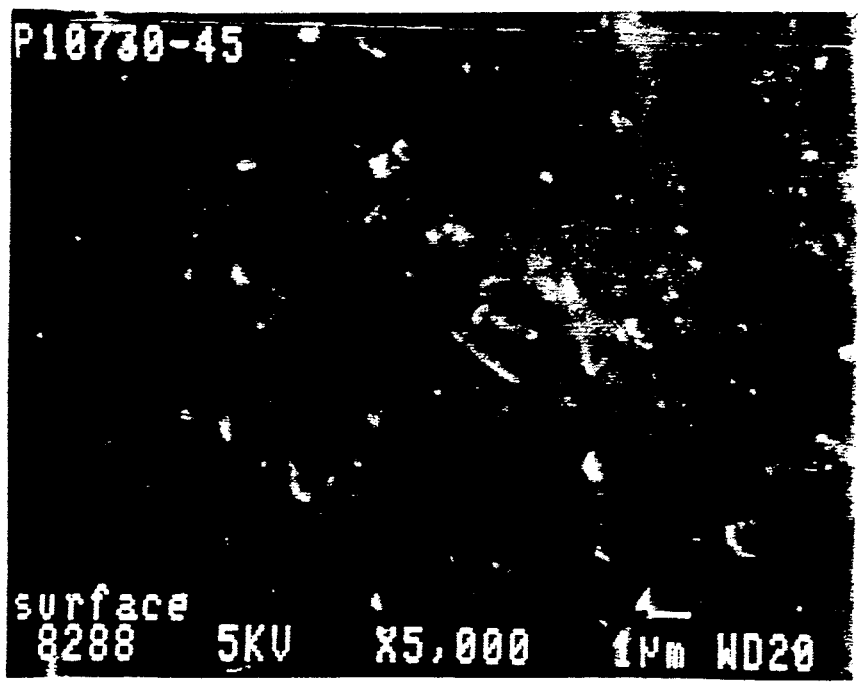
FIG. 3 is an SEM of a surface view of a bead of the invention at 5000× magnification.
Figure 4:
FIG. 4 is a view of a partial cross-section by SEM of a bead at 100× magnification showing a portion of the skin of the bead from which thickness may be readily measured.

In the case of beads, essentially the entire surface comprises a nonporous sheath having a thickness of less than about 3 microns (see FIGS. 2 and 4) By "nonporous" is meant that essentially no pores are visible at the surface in a scanning electron micrograph at a magnification of 5000 × (see FIG. 3). A pore is defined as a passage through the sheath to a void beneath the sheath. Such passages, if present, would be visible in cross-section under a microscope. At times, the sheath may be crenulated or in collapsed form giving the appearance of one or more pores, but the absence of pores can be confirmed by examining a cross-section of the sphere through the suspect zone. If the sheath is intact, no passageway to the voids below will be observed.

Figure 1:
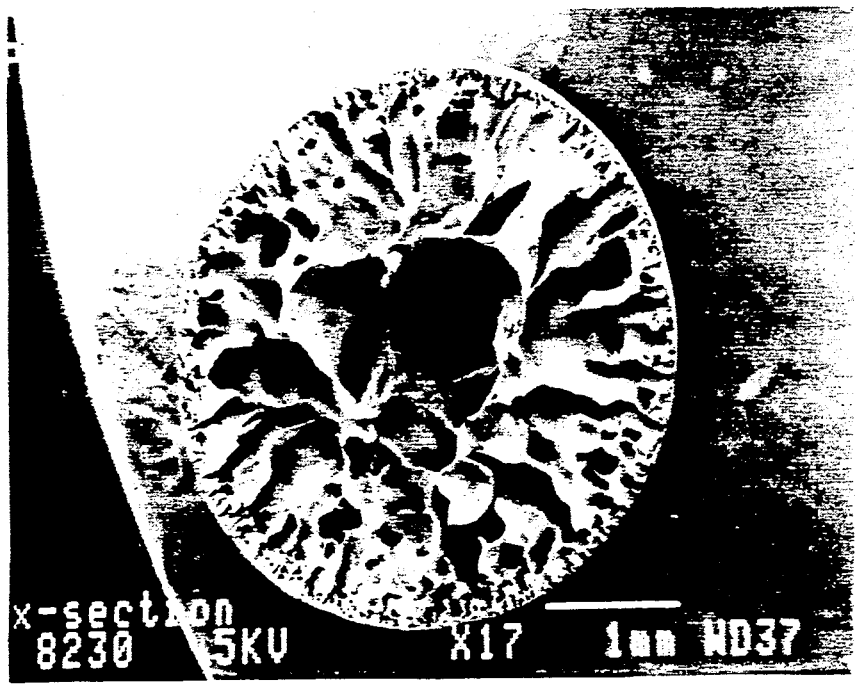
FIG. 1 is a scanning electron micrograph (SEM) of a cross-section view at 17× magnification of a shaped structure (a bead) of the invention.

The material under the sheath is in the form of cells or voids (see FIG. 1) left by extraction of the polymer solvent. A measure of the void content is obtained by density measurement as described below.

When in the form of filaments, the product of the invention has a sheath similar to that present in the beads which will of course be absent at the filament ends where lengths of filament ends have been cut. Filaments having a denier of from 60 to 1800 have been made although filaments of substantially greater denier could be prepared if desired.

In a typical procedure, the beads may be prepared as follows:

A 10% solution of a segmented polyurethane in dimethylacetamide (DMAc) is prepared. A particularly preferred polyurethane is comprised of polytetramethylene ether glycol of molecular weight between 600 and 5000, preferably between 1500 and 2500, end-capped with methylene diphenylene diisocyanate and chain extended with aliphatic diamine. Droplets of about 0.04 cc. are released from about 45 cm. above through a non-coagulating zone, e.g., air, and into a container of water (depth about 30 cm.) at 25° C. Coagulation takes place almost immediately upon contact with the water and substantially spherical beads form which are collected from the bottom of the container.

As the droplets of solution enter the coagulation bath, solidification of the polymer of the droplet begins. Large droplets will, of course, produce large beads. Droplet size will also influence porosity of the final product because of the effect of the time it takes to extract solvent from the droplet. The distance between the point the droplet is released to the surface of the coagulation bath as well as the force with which it contacts the bath will affect the shape of the final bead. Distances of from 20 to 60 cm. have given satisfactory results.

The coagulated beads are then separated from the coagulation bath, washed to ensure substantially complete removal of DMAc and subjected to drying. Temperatures and time for drying may vary considerably. Typically, a temperature range of from 25° to 80° C. is used, with drying best accomplished by passing heated air over the wet beads.

A technique similar to the above can be employed to prepare filaments, however, the spinneret surface is preferably kept in contact with the water coagulant as in a wet-spinning operation and the coagulated filament is withdrawn from the bath. Freeze-drying of the filament allows best retention of shape.

Tests and Measurement Procedures

Sheath thickness - Scanning electron micrographs of the beads at magnifications of 100× to 5000× show a continuous skin or sheath at the surface with virtually no pores or openings to the interior. The beads can be cut in half and viewed in cross-section. AT 100–3000×, the sheath thickness can be conveniently measured.

The samples are prepared for measurement as follows:

For the surface view, the bead sample was mounted directly onto an aluminum stub with double-face tape. The cross-section of the bead was obtained by submerging it in liquid nitrogen and cutting it with a razor blade. The sectioned bead was then mounted on an aluminum stub with double-faced tape. A drop of carbon paint was applied to the samples, which were then sputter-coated with gold/palladium.

A scanning electron microscope (SEM) that was used in obtaining the micrographs was a JEOL 840. The images were acquired from secondary electrons. The accelerating voltage was 5 KV. Micrographs were taken at various magnifications.

Void content - The shaped structures, e.g., beads, have numerous voids. The void content is calculated by the equation $$\text{Voids} = \left[1 - \left(\frac{\text{bead density}}{\text{bulk polymer density}}\right)\right] \times 100\%$$

Bead density is determined by dividing its mass by its volume. Assuming a spherical bead, the volume will be $4/3 \times \pi r^3$ where r is the measured radius (as with a micrometer). The bulk polymer density, if not known, may be readily measured by techniques known in the art.

Viscosity—Measured in centipoises using a Brookfield Viscometer.

EXAMPLES

Example 1

This example illustrates the preparation of microporous elastic segmented polyurethane beads of the invention.

A homogeneous solution was prepared of DMAc and the polyurethane described in Example 1 of U.S. Pat. No. 4,296,174 (Col. 5 and 6) namely, a polyurethane comprising a polytetramethylene ether glycol of molecular weight about 1800, end-capped with methylene diphenylene diisocyanate and chain extended with a mixture of aliphatic diamines, except that the ethylene diamine/1,3-oyclohexylenediamine ratio was 90/10 and the capping ratio was 1.62. The solution had a viscosity of 583 centipoise at room temperature as measured by a Brookfield Viscometer. The solution was loaded into a 500 ml pressure equalizing dropping funnel which was placed at least 18 inches above the surface of ~10 liters of distilled water contained in a 14 liter bucket. Into the center of the bucket of water was placed a double helical agitator connected to an air motor. The agitator was kept moving at a medium to high rate. The dropping funnel was placed over the outer perimeter of moving water, and the solution was dripped into the water at a rate which did not exceed 1 drop per second. The resulting droplets were initially quite gel-like; however, within 15 minutes they would become opaque white and elastic. The droplets were agitated until all of the solution was used (5–8 hours). They were then isolated and put into a bucket of agitated fresh water. This process was repeated hourly for at least 4 hours. Often the beads were washed overnight (without changing water). After the beads were thoroughly washed they were drained and excess water was pressed out. They were then loaded into aluminum pans. The beads were then placed into a vacuum oven at 60°–80° C. for 4–7 days. During this time the beads were occasionally agitated. The resulting dry beads were non-tacky, well separated, uniform spheres approximately 2–4 mm in diameter. Approximate yield was 30–40g per batch (~750 ml in volume).

Scanning electron micrographs of a sampling of the beads were made. They were found to have continuous skins less than 3 microns thick. Essentially no pores were visible at the surface of the beads at 5000× magnification. The beads had a void content in the range of 60 to 90%.

Example 2

This example illustrates the preparation of a microporous elastic segmented urethane fiber with reduced density using the invention described herein.

A 15% solids spinning solution in DMAc (about 1000 centipoises) was used. The polymer employed is the same as in Example 1. The solution was charged into a wet spinning cell which is equipped with a gear-driven piston on one end to force the solution out of the spinneret at a rate of 2.82 ml per minute. The single-hole spinneret having a length and diameter dimension of 0.015 inch ×0.015 inch, was totally immersed in coagulant water bath. The bath was controlled at 9.5° C. degree, and the solution was maintained at room temperature. The extruded filament was immediately coagulated and remained immersed for a distance of 36 inches before withdrawing and winding on bobbin at a speed of 15 meters per minute.

The wound filament was left on bobbin and soaked in water overnight. Freeze drying was found the most effective method of removing water and any solvent from the fiber while preserving the porous structure. Such dried filament can be rewound with minimum fiber sticking.

The fiber has a density of 0.181 g/cc, versus a density of 0.975 g/cc for a solid polymer fiber. SEM of the porous fiber exhibited a non-porous skin with highly voided interior.

While the above examples illustrate shaped structures of pure microporous elastic segmented polyurethane, it will be apparent to those skilled in the art that dyes, pigments and other additives may be incorporated in minor amounts in the polymer solution prior to producing the droplets or prior to spinning to the extent they are compatible with or soluble in the solvent. Also, structures of polymer blends may be prepared by dissolving other polymers in the polyurethane solution before formation of the shaped structures. In general, these other polymers, such as poly(m-phenylene isophthalamide) are added in minor amounts to not adversely affect the utility of the structure while imparting other desired qualities.

We claim:

1. A substantially spherical bead consisting essentially of microporous elastic segmented polyurethane having a void content of from 60 to 90% and encapsulated by a substantially continuous sheath having a thickness of less than about 3 microns and having essentially no pores visible at the surface at a magnification of 5000×.

2. A filament having a denier of from 60-1800, essentially of microporous elastic segmented polyurethane having a void content of from 60 to 90% and encapsulated by a substantially continuous sheath having a thickness of less than about 3 microns and having essentially no pores visible at the surface at a magnification of 5000×.

3. The shaped structure of claims 1 or 2 wherein the polyurethane is comprised of polytetramethylene ether glycol of molecular weight between 600 and 5000, end-capped with methylene diphenylene diisocyanate and chain extended with aliphatic diamine.

4. The shaped structure of claims 1, 2, or 3 wherein the polyurethane is comprised of polytetramethylene ether glycol of molecular weight about 1800, end-capped with methylene diphenylene diisocyanate and chain-extended with 90/10 ratio of ethylene diamine/1,3-cyclohexylenediamine and with a capping ratio of the diisocyanate to glycol of 1.62.

* * * * *